May 2, 1950     E. H. PLESSET     2,506,433
MAGNETIC FLUX MEASURING APPARATUS

Filed Feb. 12, 1944     2 Sheets-Sheet 1

INVENTOR.
Ernst H. Plesset
BY
ATTORNEY.

Patented May 2, 1950

2,506,433

UNITED STATES PATENT OFFICE 2,506,433

MAGNETIC FLUX MEASURING APPARATUS

Ernst H. Plesset, Los Angeles, Calif., assignor to the United States of America as represented by the United States Atomic Energy Commission Application February 12, 1944, Serial No. 522,145

5 Claims. (Cl. 175—183)

The present invention relates to measuring apparatus and more particularly to an improved apparatus for measuring magnetic flux density.

It is an object of the present invention to provide a simple apparatus which will efficiently measure magnetic flux density variation along a given path.

Another object of the present invention is to provide an improved apparatus which will accurately measure the difference in magnetic flux density between given points wherein such difference is small relative to the absolute magnetic flux density of the given points.

Still another object of the present invention is to provide an improved method of measuring accurately the magnetic flux density variation along a predetermined path or area in an efficient and rapid manner.

Figure 1:
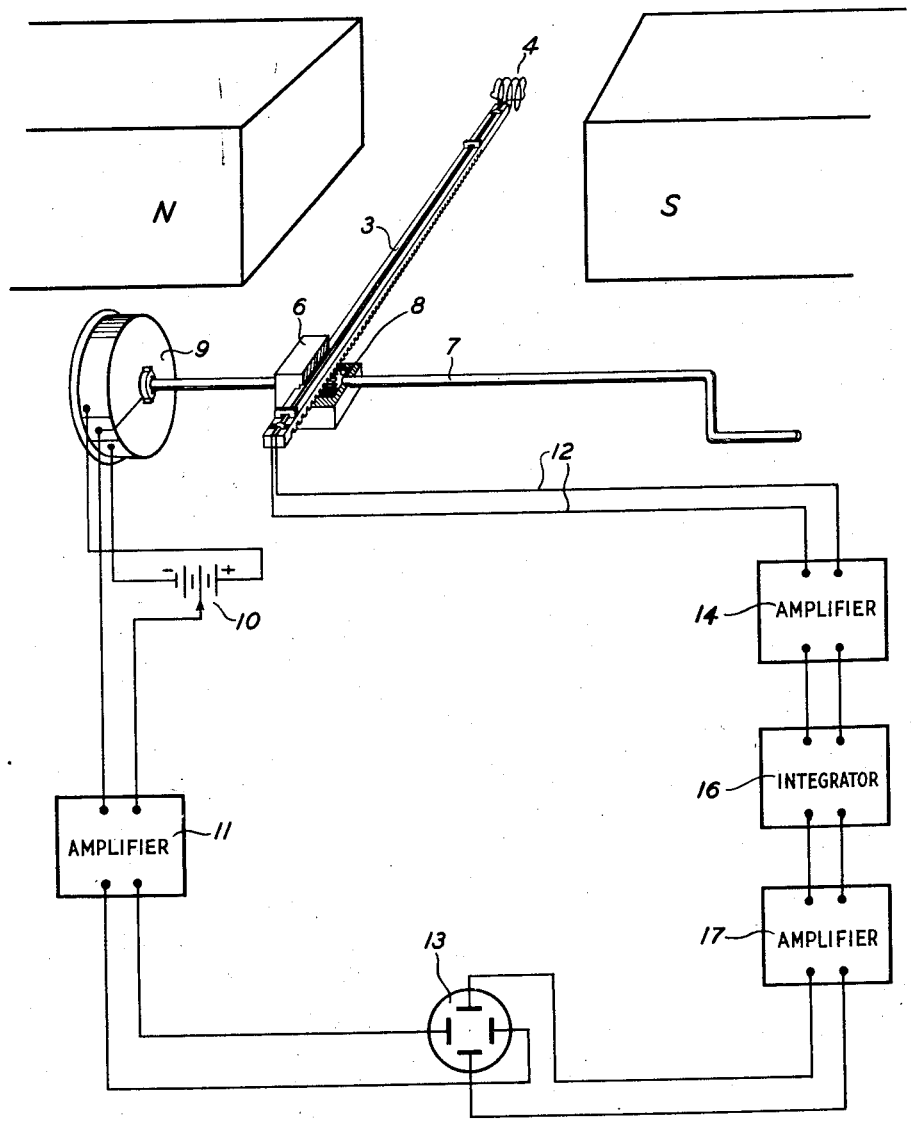
Figure 2:
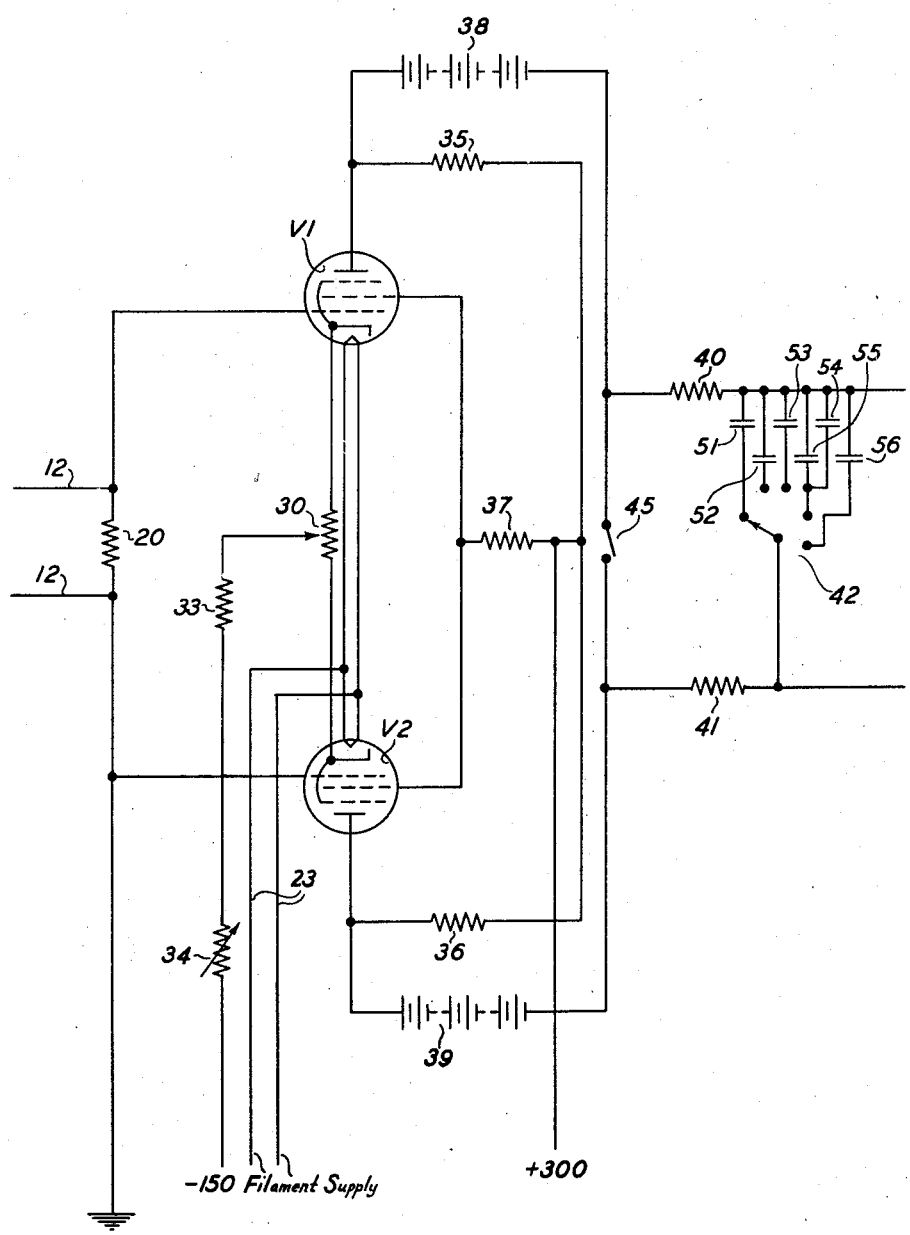

These and other objects of the present invention will be apparent from the following description and the accompanying drawings wherein Figure 1 is a conventional and block diagram of a measuring apparatus incorporating the present invention, and Fig. 2 is a schematic diagram of a portion of the circuit of the measuring apparatus illustrated in Fig. 1.

Heretofore there have been many methods used and proposed for determining the difference in magnetic flux between predetermined points or the variation of magnetic flux density along a given path or area. These methods possess many disadvantages. A device generally used in determining magnetic flux of a given region includes a flip coil employed in combination with a ballistic galvanometer. In employing this device the absolute magnetic flux density must be measured at each point along the path or in the area of which the variation of magnetic flux density is desired. It is obvious that this method is both long and tedious and the use of a ballistic galvonometer is undesirable in that the instrument itself is delicate and because of the inertia associated therewith is relatively slow acting.

Another method involves the use of an exploring or search coil which is moved through the magnetic field, the output of the coil being fed to a ballistic galvanometer. This method is also time consuming and tedious. To overcome the loss of time due to the inertia of the ballistic galvanometer a null method has been proposed wherein the current produced by the search coil is fed to the ballistic galvanometer and a balancing current is generated to maintain the galvanometer at its zero position. Since this method also requires the use of a ballistic galvanometer it requires great care in its application.

In the present apparatus the use of a galvanometer has been obviated and the accuracy of the device is virtually independent of the absolute magnetic flux density of the field of which the contour is desired. The apparatus includes an exploring or search coil which is moved along a predetermined path in which the variation of magnetic flux density is to be measured, the output of the search coil being amplified and a current resulting from the amplified output being integrated. A potential the value of which is a function of the integrated current is further amplified and applied to the vertical plates of an oscilloscope. The horizontal sweep of the oscilloscope is controlled by a potential which is a function of the relative position of the search coil along the predetermined path.

Referring now to Fig. 1 of the drawings, there is illustrated apparatus incorporating the features of the present invention and adapted for use in the measurement of a selected component of the magnetic flux density along a path in the field disposed between two magnetic poles N and S. More particularly, the apparatus comprises among other elements, a rack 3 having rigidly secured at one end thereof a search coil 4, the rack 3 being slidably engaged in a groove formed in a cooperating journal box 6. The search coil 4 is positioned in a plane normal to the component of the magnetic flux density to be measured and is in the form of a small coil of many turns having either a hollow or non-magnetic core, the sensitivity of the coil being determined by the number of turns and the area inclosed thereby. A rotatably mounted crank shaft 7 extends through the journal box 6 and carries a pinion 8 which engages the teeth of the rack 3. The crank shaft 7 is illustrated as having a hand crank positioned at one end thereof; however, a motor arrangement may be used for rotating the shaft 7, in order to project the rack 3 and the search coil 4 along a path between the magnetic poles N and S.

Inasmuch as it is desirable graphically to represent the variations in magnetic flux density along the path traversed by the search coil 4, there is provided an arrangement including a potentiometer 9, a source of potential 10 and a voltage amplifier 11. These elements cooperate to impress a voltage on the horizontal deflecting plates of an oscilloscope 13 such that the horizontal position of the trace on the oscilloscope 13 is determined by the position of the search coil 4 along its path between the magnetic poles N and S. More specifically, the potentiometer 9 has its arm fixed to one end of the crank shaft 7 and is rotatable therewith, the arm being at extreme positions when the search coil 4 is respectively at the beginning and end of its path. Connected to the terminals of the resistor of the potentiometer 9 are the terminals of the potential source 10, the arm of the potentiometer 9 and center tap of the potential source 10 being connected to the input of the voltage amplifier 11, and the output of the voltage amplifier 11 being connected to the horizontal deflecting plates of the oscilloscope 13.

The portion of the apparatus which controls the vertical sweep of the oscilloscope 13 as a function of the magnetic flux variations along the path traversed by the search coil 4 includes leads 12, a first voltage amplifier 14, an integrator 16 and a second voltage amplifier 17. The output of the search coil 4 is led through the leads 12 to the input of the first amplifier 14 which amplifier may be of any well-known type, and the output thereof is connected to the input of the integrator 16. Inasmuch as it is desirable to obtain a voltage which is proportional to the total variation of a component of a magnetic flux density, the integrator 16 is such as to produce a voltage which is a function of the time integral of the output voltage of the first amplifier 14, and an integrator of this type will be hereinafter described. The output of the integrator 16 is connected to the input of the second amplifier 17, the output of which is connected to the vertical deflecting plates of the oscilloscope 13.

Considering now the operation of the apparatus illustrated in Fig. 1, the rack 3 is brought to one end of its stroke and the portion of the apparatus including the journal box 6, the search coil 4 and the potentiometer 9 are so positioned that the search coil 4 is at the desired terminal of its predetermined path so that merely by rotating the crank shaft 7 it will traverse the desired path through the magnetic field. Thereafter the amplifiers 14 and 17 and the integrator 16 are so adjusted that the luminous spot on the screen of the oscilloscope 13 is conveniently positioned and is stationary when the search coil 4 is at rest. The crank shaft 7 is then rapidly rotated causing the search coil 4 to traverse its predetermined path, thereby generating a voltage therein, which voltage is a function of the time variation of the magnetic flux cutting the coil 4. Concurrent with the movement of the coil 4 along its predetermined path and the consequent production of the aforesaid voltage, the arm of the potentiometer 9 is rotated causing a change in the voltage input to the voltage amplifier 11, the output thereof being applied to the horizontal deflecting plates of the oscilloscope 13 causing a horizontal sweep across the screen of the oscilloscope 13. The voltage generated by the search coil 4 is fed through leads 12 to the voltage amplifier 14 which in turn amplifies such voltage and feeds the amplified voltage to the integrator 16, a voltage being developed by the integrator 16 which is a function of the time integral of the voltage output of the amplifier 14. The voltage thus developed by the integrator 16 is thence amplified by the voltage amplifier 17 and applied to the vertical deflecting plates of the oscilloscope 13. It is thus obvious from the above description that there will be produced on the screen of the oscilloscope 13 a graphic representation of the variations of magnetic flux density along the path traversed by the search coil 4.

While the amplifier 14 and associated integrator 16 may take various forms, the forms of these stages illustrated in Fig. 2 have been found to be highly successful in the present apparatus. Considering now the connection and arrangement of the amplifier 14 in greater detail, there are provided a pair of pentodes V1 and V2 the outputs of which are arranged in push-pull. The search coil 4 is connected through the leads 12 between the control grid of the pentode V1 and ground, the control grid being also grounded through the resistor 20. The cathodes of the tubes V1 and V2 are connected to the terminals of the resistor of the potentiometer 30, the arm thereof being connected through a fixed cathode resistor 33 and a variable cathode resistor 34 to a negative 150 volt potential. Since the cathode resistors 33 and 34 are of high resistance, the pentodes V1 and V2 would normally be substantially cut off thus necessitating that the cathode resistors 33 and 34 be connected to the negative 150 volt potential in order to bring the control grids of the pentodes V1 and V2 to a proper operating potential. The cathode heaters are connected through leads 23 to a filament supply, the suppressor grids of the pentodes V1 and V2 being internally connected to the cathodes thereof. A positive 300 volt plate potential is applied to the plates of the pentodes V1 and V2 through the plate resistors 35 and 36, respectively, the screen grids of the pentodes V1 and V2 being also connected to the 300 volt potential through the common screen grid resistor 37. Further, the positive terminals of batteries 38 and 39 are connected to the plates of the pentodes V1 and V2, respectively, and the negative terminals thereof are connected to the input of the integrator stage, a shorting switch 45 being provided across the input to the integrator stage.

The integrator stage comprises a circuit network including a pair of resistors 40 and 41, a plurality of condensers 51 to 56 and a selector switch 42. The above arrangement is provided in order that a series connected capacitance-resistance network of a selected time constant may be inserted across the output of the amplifier stage 14. More specifically, the resistors 40 and 41 each have a terminal thereof connected to the negative terminals of the coupling batteries 38 and 39 respectively. The other terminal of the resistor 40 is connected to a plurality of condensers 51 to 56, the other sides of the condensers 51 to 56 being connected to the taps of the selector switch 42, and the selector arm of the switch 42 is connected to the other terminal of the resistor 41. Hence, the output of the integrator stage is taken from across any selected one or group of the condensers, the condensers 54 and 55 being shunted in order to provide a capacitance which is the sum of the capacitances of the condensers 54 and 55.

The following are values for the elements which have been found to operate satisfactorily in the stages illustrated in Figure 2: the resistor 20 is 300,000 ohms; the cathode potentiometer 30 is 500 ohms; and the resistor 33 and the rheostat 34 are 20,000 ohms and 10,000 ohms, respectively. The plate resistors 35 and 36 are 40,000 ohms; and the screen grid resistor 37 is 125,000 ohms. Further, the pentodes V1 and V2 are of the 954 "Acorn" type; and the coupling batteries 38 and 39 are about 200 volts each. In the integrating network the resistors 40 and 41 are 250,000 ohms; the condensers 51 and 52 being one microfarad and two microfarads, respectively; the condensers 53, 54, and 55 being 4.75 microfarads; and the condenser 56 being 28 microfarads. It is thus seen that the capacitance of the resistance-capacitance network may be of the value of 1, 2, 4.75, 9.5 or 28 microfarads. An exploring coil having an effective area of 350 square centimeters has been used with the above arrangement.

Considering the operation of the stages illustrated in Fig. 2, when the voltage produced by the search coil is applied between the control grid of the pentode V1 and ground there results a change in the current flowing in the plate circuit thereof including the plate resistor 35, the cathode resistors 33 and 34, and part of the compensating resistor 30. Inasmuch as the cathode resistors 33 and 34 are common to both pentodes V1 and V2 the current change and the consequent voltage change across resistors 33 and 34 is impressed on the control grids of the pentodes V1 and V2. Therefore, in the arrangement shown the voltage applied via leads 12 results in excitations of opposite sign being impressed on the control grids of tubes V1 and V2, these excitations being substantially equal to a half of the applied voltage. The grid excitations of opposite sign result in changes in opposite directions of the currents flowing in the plate resistors 35 and 36 which in turn governs the voltage output to the integrating network in both magnitude and sign. Whereas it is desirable that the cathode resistors 33 and 34 be of high resistance for greater stability, the voltage drop thereacross is sufficient normally to maintain the pentodes V1 and V2 substantially at cut off. Therefore, in order to return the grids to a reasonable operating bias, the 150 volt negative potential is applied to the terminal of the cathode resistor remote from the cathode. Since the circuit network shown is characterized by its high stability and linearity as well as high amplification, it is very well adapted to the present apparatus.

The output of tubes V1 and V2 are connected through the coupling batteries 38 and 39 to the integrating network 16 which in turn is directly coupled to a second push-pull amplifier 17, the purpose of the coupling batteries being to bring the output potential of tubes V1 and V2 down to the operating potential of the control grids of the following amplifier 17. It is obvious that other direct coupling means, such as glow discharge tubes or the like may be used in place of batteries 38 and 39. The charge on the selected integrating condenser of the integrator network and consequently its potential is governed by the magnitude, sign and duration of the voltage output of the amplifier comprising the pentodes V1 and V2 as well as the values of the resistors 40 and 41 and the selected integrating condenser. The values which have been used in the present embodiment are such that the potential across the integrating condenser, for practical purposes, accurately and linearly follows the time integral of the voltage produced by the search coil which traverses a path of about six inches in approximately a quarter of a second, the magnetic flux density variations along the path being about 140 gauss per inch, the search coil producing up to a few millivolts. It is necessary that the values chosen result in a time constant which permits the integrating condenser to charge reasonably rapidly and that the leakage through the charging resistors 40 and 41 be reasonably low; thus in selecting the values a compromise between the two effects mentioned is made. The voltage across the integrating condenser, which voltage is a function of the time integral of the voltage produced by the search coil, is then amplified and applied to the vertical deflecting plates of the oscilloscope. Inasmuch as the time integral of the voltage output of the search coil is governed by the total variation in the normal magnetic flux density cutting the search coil the vertical sweep of the oscilloscope is an indication of such variation.

Reconsidering now the general operation of the apparatus incorporating the amplifier and the integrating stage illustrated in Fig. 2, it is noted that prior to taking measurements the amplifier and the integrator stage are first adjusted. More specifically, the selector switch 42 is operated to select an appropriate one of the integrating condensers 51, 52, etc. Also, the exploring coil is connected to the leads 12, the resistor 20 serving to ground the control grid of the tube V1 before the exploring coil 4 is connected. While the exploring coil 4 is maintained in stationary position, the resistor 40 is adjusted to compensate for any differences in the characteristics between the pentodes V1 and V2 and the resistor 34 is adjusted to obtain maximum stability. The stability and balance of the amplifier are indicated by the motion of the luminous spot on the screen of the oscilloscope 13, and when the adjustments mentioned are properly made the luminous spot on the screen of the oscilloscope 13 is stationary.

A preferred embodiment of the present invention has been shown but it is obvious that numerous alterations and omissions may be made without departing from the spirit thereof.

What is claimed is:

1. Apparatus for measuring the magnetic flux density variation along a predetermined path which apparatus comprises a search coil, means for moving said search coil along said predetermined path transverse to the direction of the lines of force of the magnetic field, means for maintaining the axis of said search coil substantially parallel to a fixed line transverse to said path during the movement thereof, an oscilloscope having two sets of electron beam deflecting means, means for applying to one set of said deflecting means a first potential which is a function of the position of said search coil along said predetermined path, a condenser, means coupling said search coil and said condenser for developing a charge on said condenser which is a function of the variation of the density of the magnetic flux through said search coil, and means for applying to the other set of deflecting means a second potential which is a function of the charge on said condenser.

2. Apparatus for measuring the magnetic flux density variation along a predetermined path in a magnetic field which apparatus comprises a search coil, positioning means for moving said search coil along said predetermined path transverse to the direction of the lines of force of the magnetic field, means for maintaining the axis of said coil substantially parallel to a fixed line during movement of said coil, means for producing a potential the value of which is a function of the time integral of the voltage output of said search coil, and means coordinately controlled by said positioning means and by said potential for producing a plot of the variation of the magnetic flux density along said predetermined path.

3. An apparatus for measuring the variation of magnetic flux along a predetermined path which apparatus comprises a search coil, positioning means for moving said search coil along a predetermined path transverse to the direction of the lines of force of the magnetic field whereby a voltage is developed in said search coil which is a function of the rate at which magnetic flux through said coil changes, a circuit network including a condenser operatively associated with said search coil for integrating said voltage as a function of time whereby a potential is produced across said condenser which is a function of the difference between the density of the magnetic flux through said coil at any point on said path and the starting point, and means coordinately controlled by said positioning means and by said potential for producing a plot of the variation of the magnetic flux density along said predetermined path.

4. Apparatus for detecting nonuniformities in the magnetic field of the air gap of a comparatively large substantially immobile magnet comprising the combination of a movable search coil having a plurality of turns, the area enclosed by each of said turns being small compared to the cross-sectional area of the air gap occupied by the magnetic field being prospected for nonuniformities, means for bodily moving said search coil along a predetermined path transverse to the direction of the lines of force of the magnetic field, means for maintaining the axis of said search coil substantially parallel to a fixed line transverse to said path during the movement of said search coil, a condenser, means for charging said condenser as a function of the total variation of the magnetic flux density cutting said search coil, an oscilloscope, means for controlling the sweep along one coordinate of said oscilloscope as a function of the charge on said condenser, and means for controlling the sweep along another coordinate of said oscilloscope as a function of the relative position of said search coil along said predetermined path.

5. Apparatus for detecting nonuniformities in the magnetic field of the air gap of a comparatively large substantially immobile magnet comprising the combination of a movable search coil having a plurality of turns, the area enclosed by each of said turns being small compared to the cross-sectional area of the air gap occupied by the magnetic field being prospected for nonuniformities, means for moving said search coil along a predetermined path through said magnetic field and for maintaining the turns of said search coil oriented in a predetermined fashion with respect to the lines of force of said magnetic field, and means connected to said search coil for producing indications when the magnitude of the E. M. F. induced into a side of each of the turns of said search coil by virtue of the movement of said search coil in said magnetic field differs from the magnitude of the E. M. F. induced into another side of each of the turns of said search coil, whereby nonuniformity of the aforesaid magnetic field is indicated.

ERNST H. PLESSET.

REFERENCES CITED

The following references are of record in the file of this patent:

UNITED STATES PATENTS

| Number | Name | Date |
|---|---|---|
| Re. 21,927 | Brace et al. | Oct. 21, 1941 |
| 1,832,128 | Klopsteg | Nov. 17, 1931 |
| 2,054,672 | Edgar | Sept. 15, 1936 |
| 2,067,262 | Demontvignier et al. | Jan. 12, 1937 |
| 2,238,072 | Nelson et al. | Apr. 15, 1941 |
| 2,291,692 | Cloud | Aug. 4, 1942 |
| 2,367,614 | Rich | Jan. 16, 1945 |

OTHER REFERENCES

The Engineer, December 27, 1935, pages 667–669.